US006650347B1

(12) United States Patent
Nulu et al.

(10) Patent No.: US 6,650,347 B1
(45) Date of Patent: Nov. 18, 2003

(54) HEIRARCHICAL GUI REPRESENTATION FOR WEB BASED NETWORK MANAGEMENT APPLICATIONS

(75) Inventors: Deepak Nulu, San Jose, CA (US); Sanjeev Ukhalkar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/256,638

(22) Filed: Feb. 24, 1999

(51) Int. Cl.[7] .................................................. G09G 5/00
(52) U.S. Cl. ........................ 345/853; 709/223; 700/83
(58) Field of Search ................................ 345/356, 357, 345/340, 349, 853, 854, 781, 839, 969; 709/223, 224; 700/83

(56) References Cited

U.S. PATENT DOCUMENTS

| | | | | |
|---|---|---|---|---|
| 5,630,061 A | * | 5/1997 | Richter et al. ............... | 709/227 |
| 5,809,286 A | * | 9/1998 | McLain, Jr. et al. .......... | 703/23 |
| 5,838,907 A | * | 11/1998 | Hansen ....................... | 709/220 |
| 5,887,139 A | * | 3/1999 | Madison, Jr. et al. ....... | 709/223 |
| 5,999,179 A | * | 12/1999 | Kekic et al. ................. | 345/349 |
| 6,009,466 A | * | 12/1999 | Axberg et al. ............... | 709/220 |
| 6,095,674 A | * | 8/2000 | Verissimo et al. ............ | 700/83 |
| 6,145,098 A | * | 11/2000 | Nouri et al. .................. | 714/31 |
| 6,151,023 A | * | 11/2000 | Chari .......................... | 345/839 |
| 6,154,465 A | * | 11/2000 | Pickett ........................ | 370/466 |
| 6,205,476 B1 | * | 3/2001 | Hayes, Jr. .................... | 709/220 |
| 6,212,559 B1 | * | 4/2001 | Bixler et al. .................. | 709/221 |
| 6,229,540 B1 | * | 5/2001 | Tonelli et al. ............... | 345/853 |

OTHER PUBLICATIONS

CISCO, Getting Started With Cisco View 4.2, User Guide, 1992—2002, 243 pages.

* cited by examiner

*Primary Examiner*—John Cabeca
*Assistant Examiner*—Tadesse Hailu
(74) *Attorney, Agent, or Firm*—Blakely, Sokoloff, Taylor & Zafman LLP

(57) ABSTRACT

An apparatus for maintaining networking hardware. One embodiment comprises a graphical user interface having a maintenance menu and a resource tree in an architectural arrangement. The resource tree also has a networking resource. The graphical user interface may further comprise a configuration window which may further comprise a parameter field. The graphical user interface may also further comprise a context sensitive menu associated with the networking resource and/or a global banner window which may span the top of the graphical user interface. In various embodiments the resource tree may be horizontal, vertical and/or on the left hand side of the graphical user interface. Also, a lower level networking resource may be indented beneath a higher level networking resource and the higher level and lower level networking resources may be traced to one another. The networking resource may further comprise an icon and a text field.

77 Claims, 16 Drawing Sheets

Node Configuration
================

| Parameter | Type | GUI Widget |
|---|---|---|
| General | | |
| Node Name | Read Write | Textfield |
| Shelf Date | Read Write | Textfield |
| Shelf Time | Read Write | Textfield |
| Shelf Time Zone | Read Write | Popup Menu |
| Shelf Time Zone Offset | Read Write | Spinner |
| IP Configuration | | |
| IP address | Read Write | Textfield |
| Interface | Read Only | Label |
| Netmask address | Read Write | Textfield |
| Broadcast address | Read Only | Label |
| Trap Manager | | |
| Trap Manager IP Address | Read Write | Textfield |
| Trap Manager Port # | Read Write | Textfield |
| Stats Manager | | |
| Stats Manager IP Address | Read Write | Textfield |
| Stats Collection Interval | Read Only | Label |
| Stats Bucket Interval | Read Only | Label |
| Clock Source | | |
| Primary Clock Source | Read Write | Radio Buttons |
| Secondary Clock Source | Read Write | Radio Buttons |
| Current Clock | Read Write | Radio Buttons |
| Clock Switch State | Read Only | Label |
| External Clock | Read Only | Label |
| External Clock Source Impedence | Read Write | Radio Buttons |
| External Clock Connector type | Read Write | Radio Buttons |

FIG. 9

Card Configuration
================

| Parameter | Type | GUI Widget |
|---|---|---|
| General | | |
| Slot Number | Read Only | Label |
| Card Type | Read Only | Label |
| Card State | Read Only | Label |
| Card Serial Number | Read Only | Label |
| Card Hardware Revision | Read Only | Label |
| Card Firmware Revision | Read Only | Label |
| MIB Version Number | Read Only | Label |
| Fab Number | Read Only | Label |
| Card Reset Reason | Read Only | Label |
| Config. Change Type | Read Only | Label |
| Alarm | Read Only | Label |
| Line Module | | |
| Line Module Type | Read Only | Label |
| Line Module State | Read Only | Label |
| Line Module Serial Number | Read Only | Label |
| Line Module Hardware Revision | Read Only | Label |
| Line Module Firmware Revision | Read Only | Label |

FIG. 10

DS1 Line Configuration for FRSM
===========================

| Parameter | Type | GUI Widget |
|---|---|---|
| General | | |
| Slot Number | Read Only | Label |
| Line Number | Read Only | Label |
| Card Type | Read Only | Label |
| Line Type | Read Write | Popup Menu |
| Line Connector Type | Read Only | Label |
| Line specific configuration | | |
| Line Coding | Read Write | Option |
| Line Length | Read Write | Option |
| Line Transmit Clock Source | Read Write | Radio |
| Line Loopback | Read Write | Radio |
| Line Send Code | Read Write | Option |
| Line used DS0 Timeslots | Read Write | Checkboxes |
| Alarms | | |
| Alarm State | Read Only | List |
| Statistical Alarm State | Read Only | List |
| Alarm Configuration | | |
| Red Severity | Read Write | Radio Buttons |
| RAI Severity | Read Write | Radio Buttons |
| Near End Alarm Up Count | Read Write | Textfield |
| Far End Alarm Up Count | Read Write | Textfield |
| Near End Alarm Down Count | Read Write | Textfield |
| Far End Alarm Down Count | Read Write | Textfield |
| Near End Alarm Threshold | Read Write | Textfield |
| Far End Alarm Threshold | Read Write | Textfield |
| BERT (Bit Error Rate Test) | | |
| BERT Enable | Read Write | Radio |
| BERT Pattern | Read Write | Popup Menu |
| BERT Result | Read Only | Label |

FIG. 11

Frame Relay Port Configuration
========================

| Parameter | Type | GUI Widget |
|---|---|---|
| General | | |
| Slot Number | Read Only | Label |
| Line Number | Read Only | Label |
| Port Number | Read Only | Label |
| Port Type | Read Write | Radio Buttons |
| Port Speed | Read Only | Label |
| Port State | Read Only | Label |
| | | |
| Port Specific Configuration | | |
| DS0 Config. Bit Map | Read Write | Checkboxes |
| DS0 Speed | Read Write | Radio Buttons |
| Flags Between Frames | Read Write | Spinner |
| Egress Queue Service Ratio | Read Write | Spinner |
| | | |
| LMI (Local Management Interface) Configuration | | |
| Signalling Protocol Type | Read Write | Popup Menu |
| Link Integrity Timer | Read Write | Textfield |
| Polling Verification Timer | Read Write | Textfield |
| Full Status Polling Counter | Read Write | Textfield |
| Error Threshold | Read Write | Spinner |
| Monitored Event Count | Read Write | Spinner |
| Enhanced LMI | Read Write | Radio Buttons |
| | | |
| CLLM (Consolidated Link Layer Management) Configuration | | |
| CLLM Enable | Read Write | Radio Buttons |
| CLLM Transmit Status Timer | Read Write | Textfield |
| CLLM Receive Status Timer | Read Only | Label |

FIG. 12

Frame Relay Channel Configuration
===============================

| Parameter | Type | GUI Widget |
|---|---|---|
| General | | |
| Slot Number | Read Only | Label |
| Line Number | Read Only | Label |
| Port Number | Read Only | Label |
| Channel Number | Read Only | Label |
| DLCI | Read Write | Textfield |
| Channel Type | Read Write | Popup Menu |
| Egress Queue | | |
| Egress Queue Id | Read Write | Radio Buttons |
| Egress Queue Depth | Read Write | Textfield |
| Egress Queue DE Threshold | Read Write | Textfield |
| Egress Queue ECN Threshold | Read Write | Textfield |
| Ingress Queue | | |
| Ingress Queue Depth | Read Write | Textfield |
| Ingress Queue DE Threshold | Read Write | Textfield |
| Ingress Queue ECN Threshold | Read Write | Textfield |
| Policing | | |
| Committed Rate | Read Write | Textfield |
| Committed Burst | Read Write | Textfield |
| Excess Burst | Read Write | Textfield |
| Initial Burst | Read Write | Textfield |
| DE Bit Tagging | Read Write | Radio Buttons |
| Egress Service Rate | Read Write | Textfield |
| Foresight | | |
| Foresight Enable | Read Write | Radio Buttons |
| Minimum Rate | Read Write | Textfield |
| Peak Rate | Read Write | Textfield |
| Quiescent Rate | Read Write | Textfield |

FIG. 13

HEIRARCHICAL GUI REPRESENTATION FOR WEB BASED NETWORK MANAGEMENT APPLICATIONS

FIELD OF INVENTION

The field of the invention relates to networking maintenance. Specifically, the invention relates to a graphical user interface for maintaining networking hardware operation.

BACKGROUND OF THE INVENTION

In the days of proprietary, centralized mainframe computing the choices and parameters affecting purchases of networking hardware were limited. Vendor choices were relatively sparse as few suppliers had access to the mainframe's proprietary networking technology. Furthermore, as desktop technology was limited to mere terminals, implementation of the network itself was somewhat simplistic. For example, the routing associated with electronic mail messages between neighboring co-workers was generally performed inside the mainframe rather than within a dedicated networking box on the Local Area Network (LAN).

With the PC Revolution and disappearance of the mainframe the difficulty associated with network implementation scaled upward. With LAN based client/server computing much of the networking traffic once handled within the mainframe now appears as offered load to the LAN. For example, electronic mail messages between neighboring co-workers usually requires multiple hops across a router or switching hub.

Complicating the networking requirements is the steady progress in silicon technology. As microprocessors continue to expand in performance the type of media traffic on the LAN has evolved from mere data (such as files and e-mail) to real time voice (such as Voice Over IP) and even real time video. Thus, the transformation from centralized to distributed computing has resulted in greater network complexity.

Furthermore, as the mainframe's proprietary networks were replaced by industry standard based network technologies (e.g., TCP/IP or ATM), a myriad of different suppliers each manufacturing functionally identical or nearly identical hardware (similar to the present day PC industry) have emerged. Criteria for distinguishing between competing suppliers requires in-depth focus of each product offering in order to identify subtle (yet important) differences.

Thus, the evolution to distributed computing has resulted not only in more complex networking requirements but also more sophisticated purchasing decisions. One technology area where these two concepts merge is networking maintenance. Networking maintenance involves the day-to-day operation of running the network. System upgrade, system installation, repairing failures and adjusting topology to better suit flow control are all tasks associated with network maintenance. Various maintenance tasks are performed for each piece of equipment within the network as well as the overall network itself.

As networks have become more complex the demands on those responsible for running the network and its equipment have become more demanding. Thus it is highly desirable to have user friendly, powerful software environments that enable network managers to perform their responsibilities activities easily and efficiently. Generally each piece of networking hardware has its own maintenance software tool used to configure and monitor the equipment. However, control of each individual machine within a network may be centralized to a web based platform (or other platform communicatively coupled to each machine). These tools may further communicate with a higher level software tool that configures and monitors the entire network.

A maintenance tool's ease of use and degree of sophistication are major determinants in differentiating between competing vendors. Furthermore, other than low level protocols (e.g., SNMP), maintenance tools are not standardized by the networking industry. Thus each supplier has a wide field upon which innovative and varied tools (particularly at the user interface level) may be developed in an effort to differentiate from competition.

To date, however, many maintenance tools have been difficult to use. This stems largely from the basic architecture of the tool. For example, past maintenance tools have a separate page for each resource type (e.g., cards, lines, ports, slots, etc.) resulting in a non-consistent and cluttered user interface. Such an interface makes keeping track of the networking box's configuration confusing and difficult.

SUMMARY OF THE INVENTION

An apparatus comprising a graphical user interface having a maintenance menu and a resource tree where the resource tree has an architectural arrangement and a networking resource. A method is also described comprising selecting, within a networking resource tree having an architectural arrangement, a networking resource and then initiating the appearance of a maintenance menu.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 1b shows an application of the networking box of FIG. 1a.

FIG. 9 is a more comprehensive list of the various parameters associated with node resources.

FIG. 10 is a more comprehensive list of the various parameters associated with card resources.

FIG. 11 is a more comprehensive list of the various parameters associated with DS1 (T1/E1) line resources.

FIG. 12 is a more comprehensive list of the various parameters associated with Frame Relay port resources.

FIG. 13 is a more comprehensive list of the various parameters associated with Frame Relay channel resources.

DETAILED DESCRIPTION

An apparatus for maintaining networking hardware is described. One embodiment comprises a graphical user interface having a maintenance menu and a resource tree in an architectural arrangement. The resource tree also has a networking resource. The graphical user interface may further comprise a configuration window which may further comprise a parameter field. The graphical user interface may also further comprise a context sensitive menu associated with the networking resource and/or a global banner window which may span the top of the graphical user interface.

In various embodiments the resource tree may be horizontal, vertical and/or on the left hand side of the graphical user interface. Also, a lower level networking resource may be indented beneath a higher level networking resource and the higher level and lower level networking resources may be traced to one another. The networking resource may further comprise an icon and a text field.

In still another embodiment, there exists a graphical user interface with a maintenance menu and a resource tree having an architectural arrangement where the resource tree has a card resource and the card resource has a line resource. There may also exist a line context sensitive menu associated with the line resource that may have a line enable menu choice and/or a create port menu choice. There may exist a port context sensitive menu associated with the port resource that has an add channel menu choice and/or a delete port menu choice. There may also be a channel context sensitive menu associated with the channel resource. The channel context sensitive menu may further comprise a delete channel menu choice.

In further embodiments the parameter field may be a line parameter field having a line status parameter, a line encoding parameter, and/or a clock source parameter. A parameter field may also correlate a frame slot to a port. In still further embodiments, the resource tree may further comprise an auxiliary resource having a redundancy resource, a device log resource and/or a trap managers resource.

A further embodiment involves selecting a networking resource and then initiating the appearance of a maintenance menu. The method may further comprise selecting a port resource wherein a line resource has a port resource. The method may also further comprise initiating the appearance of a context sensitive menu associated with the line resource and then creating a new port, enabling a line, disabling a line and/or setting a line parameter.

Figure 1A:
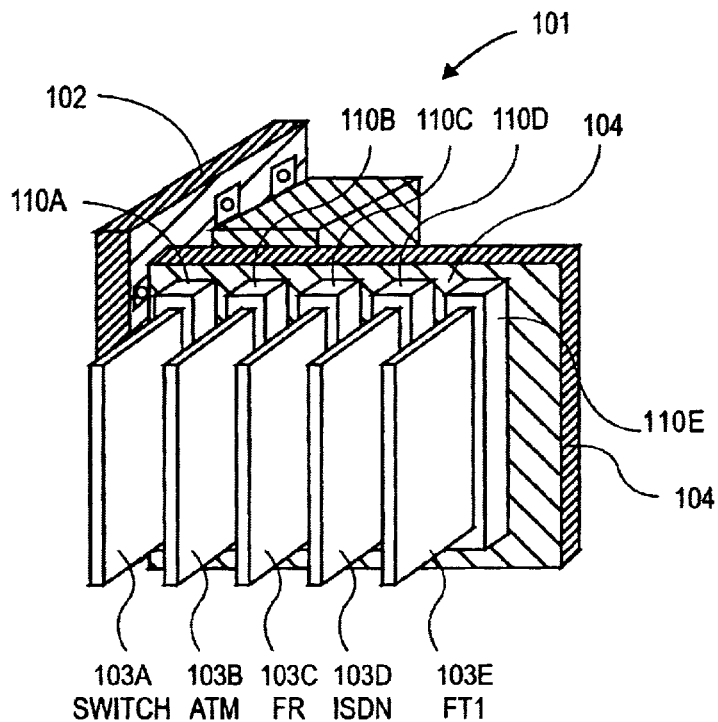
FIG. 1a shows a networking box.

FIG. 1a shows typical networking hardware equipment (hereinafter, "box") 101. The box 101 has an outer cage (not shown) mounted to a rack or frame 102. One of the rack's 102 functions is to hold various cards 103. The cards 103 are usually plugged into a connector 110 of the backplane 104 through which the various cards 103 may communicate. Most boxes have at least one card (e.g., switch card 103a) that is used for switching or routing the traffic that flows through the box 101.

Figure 1B:
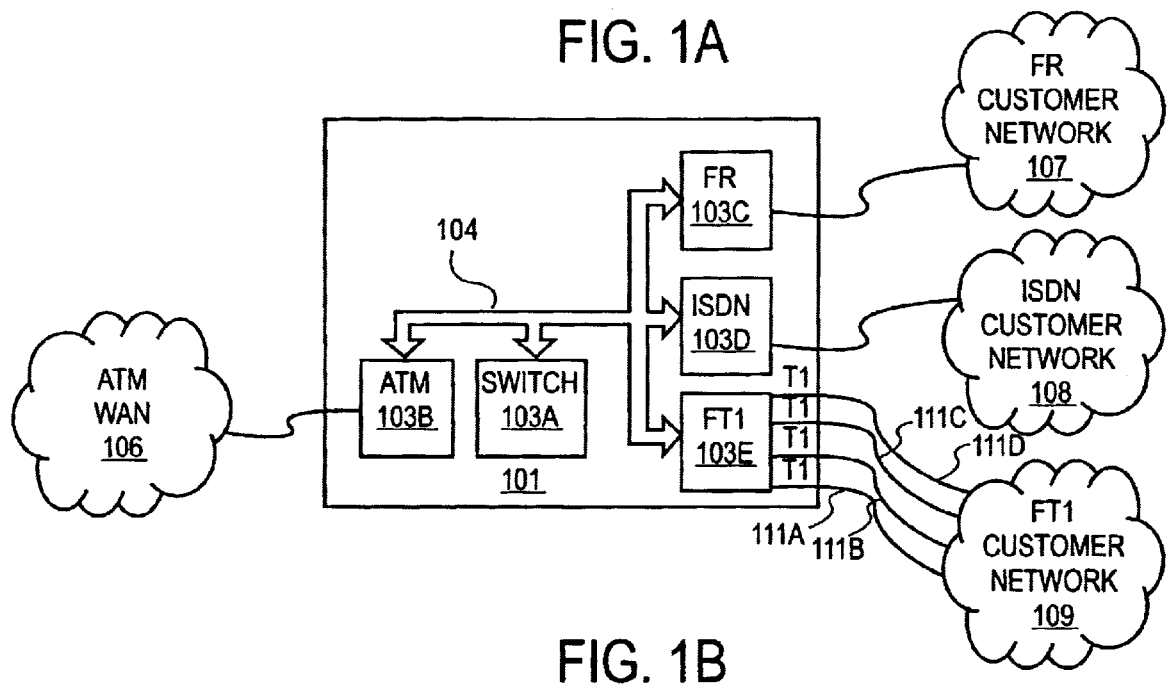

Most cards within box 101, however, are adapter cards 103b–103e (e.g., ATM card 103b, Frame Relay (FR) card 103c, ISDN card 103d, and a Fractional T1 (FT1) card 103e). Adapter cards 103b–103e are the interface between the switch card 103a and the physical network(s) 106–109 to which the box 101 is connected. That is, referring to FIG. 1b as an example, box 101 is an access node to an ATM Wide Area Network (WAN) 106, for three separate services: a Frame Relay service, an ISDN service and an FT1 service. Typically, the adapter cards 103b–103e send traffic to/from their respective networks 106–109 from/to the switch card 103a. The switch card 103a directs all incoming traffic to the proper destination network.

Figure 2A:
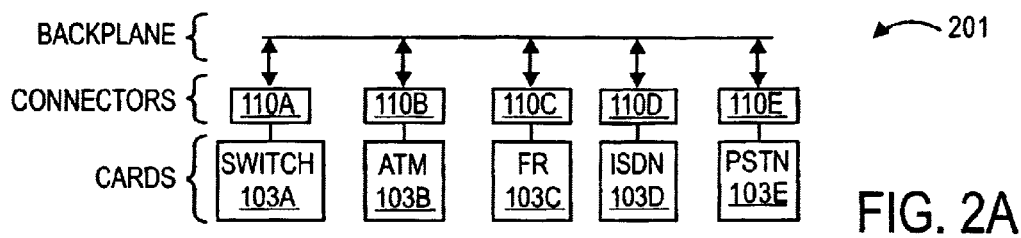
FIG. 2a shows an architectural perspective of the box of FIG. 1 at the card level.
Figure 2B:
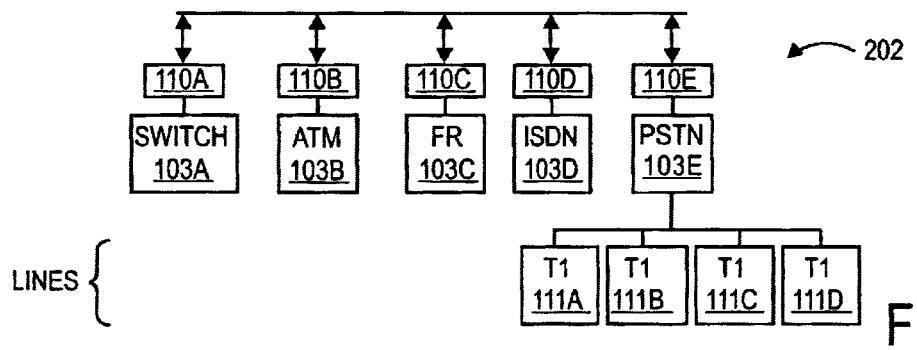
FIG. 2b shows an architectural perspective of the box of FIG. 1 at the line level.

The specific organization of cards and/or functions within box 101 is generally referred to as the architecture of box 101. Any visual attempt to convey the architecture is referred to as an architectural perspective. The architectural perspectives of box 101 (or any other box) may be viewed at varying levels of detail. For example, referring to FIG. 2a, one of the basic (i.e., less detailed) architectural perspectives 201 simply identifies which cards 103a–e are plugged into which connectors 110a–e (using the connector numbers that corresponds to the box 101 shown in FIG. 1). More detailed architectural perspective also exist. For example, referring briefly back to FIG. 1b, assume FT1 card 103e has four T1 connections or lines 111a–d on the card 103e. A more detailed architectural perspective 202 will therefore include the four T1 lines 111a–d of the FT1 adapter card 103e as shown in FIG. 2b.

Figure 2C:
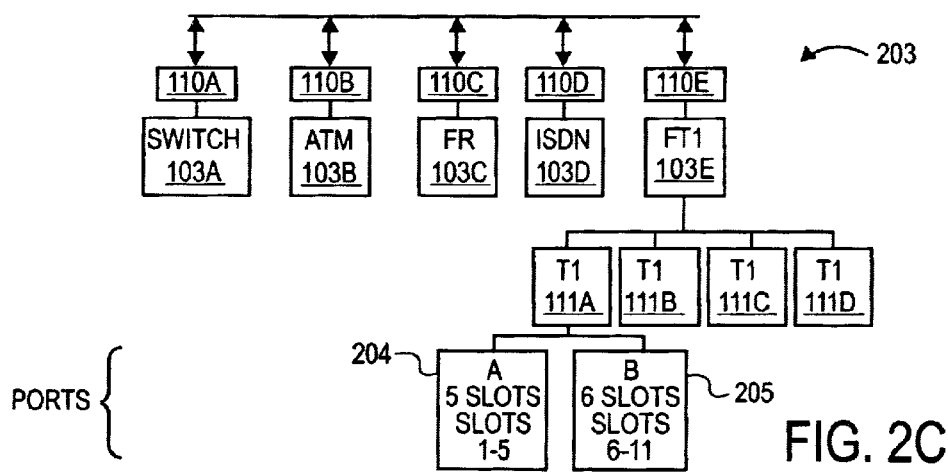
FIG. 2c shows an architectural perspective of the box of FIG. 1 at the port level.
Figure 2D:
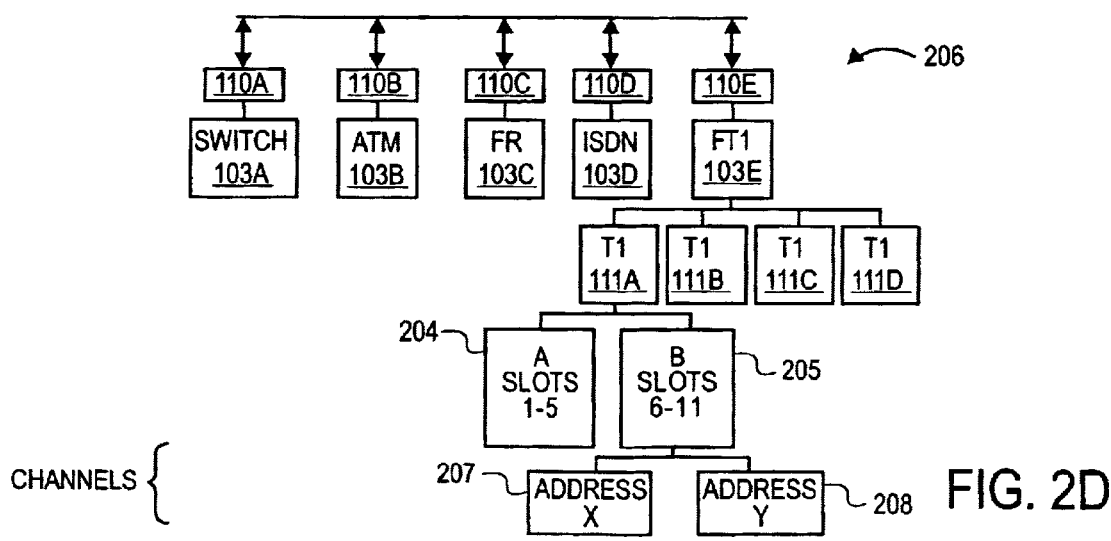
FIG. 2d shows an architectural perspective of the box of FIG. 1 at the channel level.

More detailed architectural perspectives are still possible. For example, each T1 line (e.g., line 111a) may be further divided into logical ports (hereinafter "ports"). A single T1 frame is divided into twenty-four 64 kbps slots. Random groupings of any of these twenty-four slots may form a port. For example a specific customer or user (e.g., customer or user A) of the FT1 service may only require 320 kpbs of service. Another customer or user (e.g., customer or user B) of the FT1 service may only require 384 kpbs of service. As 320 kpbs only consumes 5 slots (5×64 kbps=320 kpbs) and 384 kbps only consumes 6 slots (6×64=384 kbps), customer A may be configured for a port of 5 slots and customer B may be configured for a port of 6 slots on the same T1 line (e.g., line 111a). This leaves 13 of the 24 slots remaining open on T1 line 111a. FIG. 2c is a further detailed architectural perspective 203 of box 101 that shows the configuration of ports 204, 205 for customer/user A and B respectively. Furthermore, in situations where the customer requires his traffic to travel to any destination as opposed to a specific destination, further division of a port with a channel is necessary. The division of a port into a channel is logical. A port looks like a single pipe and multiple channels of traffic may flow in it. A channel is a stream of traffic within a port having a certain address. That is a channel is associated with a stream address as opposed to its time slot. Each channel is uniquely identified by a unique address. A channel is associated with a stream so that they can be handled differently. FIG. 2d shows an architectural perspective 206 that shows two channels 207, 208 for port 205.

For network managers, various degrees of architectural specificity are needed depending on the specific task they must perform. For example, if the network manager needs to configure a channelized port, specificity to the degree of FIG. 2d is necessary. However, if the network manager only needs to know the number of connectors currently vacant on a particular box, specificity to the degree of FIG. 2a is necessary.

Thus a desired feature of a maintenance tool is the ability to expand and collapse varying degrees of architectural specificity quickly and easily. Furthermore, another desired feature of a maintenance tool is the immediate conception of the architecture of the box. For example, referring to FIG. 2d, one can readily see that customer B's channelized port 205 operates from a card plugged into connector 110e and not connector 110b.

Figure 3:
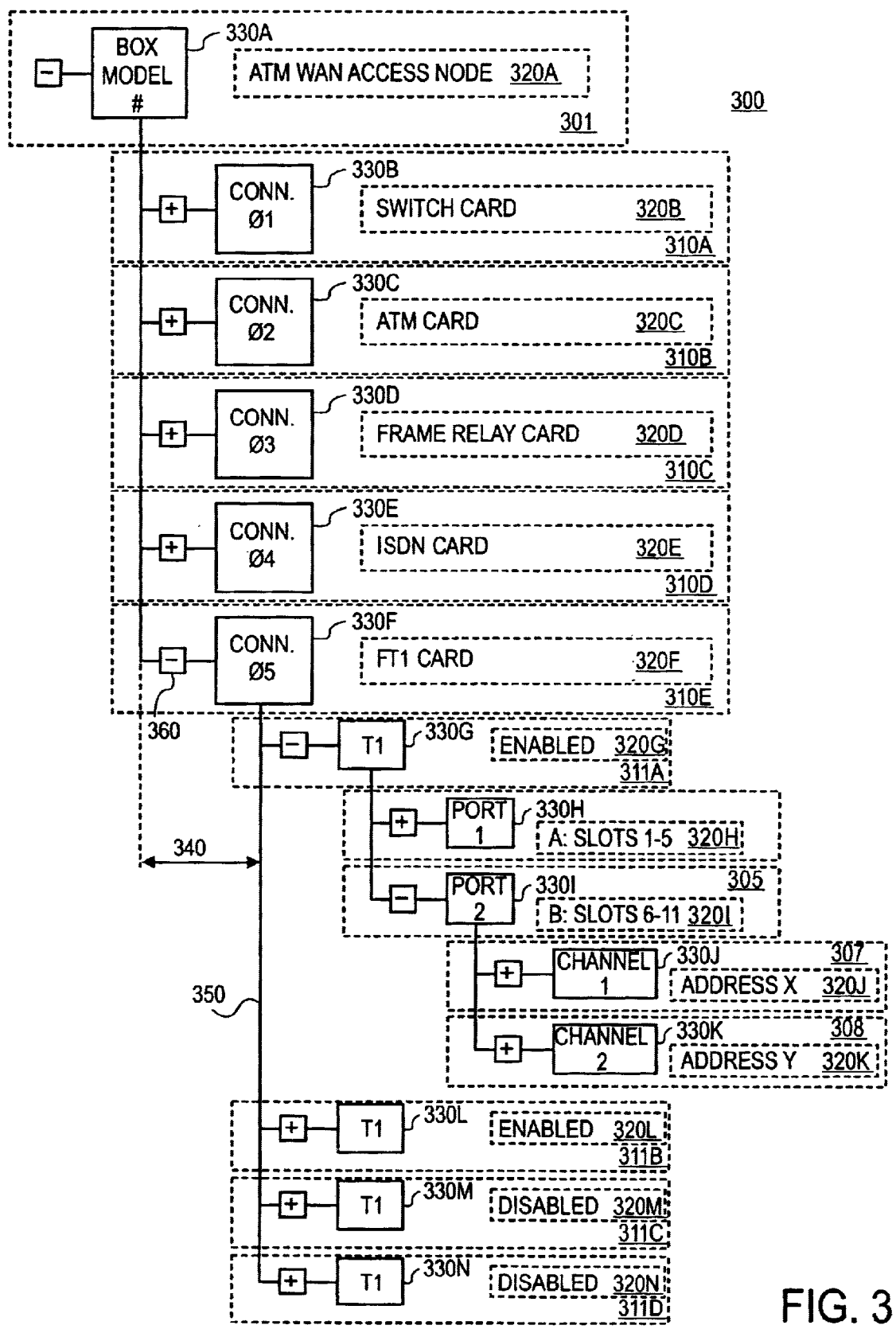
FIG. 3 shows a resource tree for the box of FIG. 1 and the architectural perspectives of FIG. 2.

Both desired features are realizable through a resource tree. FIG. 3 is an embodiment of a resource tree 300 that corresponds to the architectural perspective 206 of FIG. 2d. Resource trees are logical arrangements of resources where specific lower level resources are categorized as being within specific higher level resources. As an example, channel resources 307, 308 (lower level resources) are resources of port resource 305 (higher level resource). If a lower level resource is categorized within a higher level resource then the higher level resource "has" the lower level resource. Alternatively, lower level resources may "belong to" higher level resources. Thus, port resource 305 "has" channel resources 307, 308. Similarly, connector resource 310e also "has" channel resources 307, 308.

A resource is a visual representation of any entity having utility. The architecture of the box is readily apparent from a resource tree since, in relation to the operation of the box, lower level resources add some form of utility to higher level resources. As an example, referring to FIG. 3, connector resource 310e enables networking cards to be plugged into box resource 301 (the highest level resource) thereby enabling communication between a switch card (e.g. card 103a) and an adapter card (e.g. card 103e); line resource 311a provides physical and logical network connectivity to connector resource 310e; port resource 305 enables fractionalized service to line resource 311a; and channel resources 307,308 allow channelized service of port resource 305. The common feature among all these resources is their relationship to networking. That is, each resource provides some networking utility and, as such, all may be referred to as networking resources. Other embodiments may take the resource tree outside the networking environment. For example, a maintenance tool for a computer may also have a resource tree displaying the architecture of the computer. Such a resource tree would have computing resources (e.g., a VGA adapter card resource or a SCSI hard drive resource).

The visual representation of the resource may have any icon (e.g., icons 330a–n) or text or combination thereof which may include some additional text (e.g., text fields 320a–n) that further identifies and characterizes the specific resource. For example, concerning connector resource 310a, connector resource icon 330b is identified as representative of connector "01" while the connector resource text field 320b identifies the type of card ("switch card") plugged into the connector. The node resource 330a simply identifies the type of machine being managed. It may also identify other node parameters like the name assigned to the node etc.

It is important to note a few different embodiments. Specifically, the text identifier 320b associated with connector resource 310a identifies the card plugged into the connector. Thus the connector and card architectural levels have merged to a single level. Alternatively, the card may be identified within the icon 330b and the connector identified in the text field 320b. Further still, the connector and card levels may not be merged (thus the card becomes a lower level resource of the connector). Regardless of which is used, for purposes of simplicity, any resource embodiment having either card level information, connector level information or both will be referred to as a "card" resource. Hereinafter these resources will be so referred. Icons may be generic (e.g., a file folder icon similar to those in PC operating system file manager resource trees) or customized (e.g., a depiction of an adapter card for a card resource).

Furthermore, the visual display of the resource tree as a whole should (as discussed) make the box architecture readily apparent. In the embodiment of FIG. 3, this is accomplished by: 1) placing lower level resources directly beneath the next highest level resource and 2) indenting and tracing each lower level resource to its next highest level resource. For example, the four T1 lines 311a–d are lower level resources of the card resource 310e (the next highest resource). Each T1 line resource 311a–d is therefore directly beneath card resource 310e as well as indented (e.g., indent 340) and traced (e.g., trace 350) to card resource 310e.

Other embodiments are possible, however. For example, similar to the architectural perspectives of FIG. 2, the lower level resources may be spread (rather than indented) directly beneath a higher level resource. This embodiment may be more efficient for applications requiring a horizontal window frame shape for the resource tree while the former embodiment (of FIG. 3) may be more efficient for applications requiring a vertical window frame'shape for the resource tree. Other embodiments may place the lower level resources above or to the side of the next higher level resource. All embodiments should provide some form of tracing (e.g., trace 305) but this is not an absolute requirement. Tracing is any depiction that makes some form of connection between a higher and lower level resource.

Typically, a line resource is any resource that identifies a single physical layer connection. Thus the term line resource may include not only a single T1 line but also a single T3, OC-3, OC-12 or other single physical layer line. Furthermore, in striped applications (such as a 4×OC-3 to create a single OC-12 pipeline) the term line may be used to refer to either the individual lines (e.g., each OC-3 line) or the comprehensive logical channel (e.g., the OC-12 pipeline).

In summary, the resource tree has an architectural arrangement if the overall presentation (e.g., placement of lower level resources in relation to the placement of higher level resources, tracing, etc.) conveys an architectural perspective of the box to the viewer. As discussed, displaying the resource tree in an architectural arrangement allows for easier completion of networking maintenance tasks for network managers.

Another preference, as discussed, is the ability to quickly and easily collapse and expand the resources of the resource tree. This allows for quick and easy access to different architectural perspectives. Resource tree interfaces allow this capability. For example, the "–" and "+" labels (e.g., label 360) associated with each resource identify whether a resource is expanded or not. For one embodiment, pointing a mouse arrow onto the label and clicking toggles the status of the display for that resource between expanded and not expanded. FIG. 3 shows: card resource 310e expanded and all other card resources 310a–d not expanded; line 311a expanded and lines 311b–d not expanded and port 305 expanded. Thus by pointing and clicking on the resources numerous other architectural perspectives are rapidly obtainable. There may also be configurable options to collapse or expand everything below a resource or only to limited depths (in the hierarchy).

So far the discussion has related mostly to displaying an architectural perspective. However, the architectural perspective display is only one aspect of the maintenance tool. Another aspect is the functionality of the tool itself. That is, the resource tree is used by network managers to invoke various maintenance tasks and/or application programs. As such, associated with the architectural display is the ability to maintain or configure various networking resources. Thus the tool typically has a menu (or equivalent device) for initiating maintenance applications. Such menus may be referred to as maintenance menus. It is important to note that terms like maintenance or configuration may be used synonymously. That is, maintenance windows may also be used to initiate configuration software as well.

Context sensitive menus (CSMs) are one embodiment of a maintenance menu and thus CSMs may be used to initiate maintenance applications. A CSM usually contains unique menu options for a selected resource. For example, the network manager simply points at a resource icon and clicks on it. If the resource has an associated CSM, a pop-up menu appears having special tasks or applications unique for that resource as well as any general tasks that also apply. In some embodiments the right mouse button will pop up the CSM. However, which mouse button is used is configurable by the designer and/or the users.

Furthermore, in order to extend the resource tree to a complete maintenance tool, more windows besides the resource tree window may be desirable. For example, various embodiments may employ another user interface, referred to as a configuration window, which is used to read or enter various states and/or parameters. Further still, a global banner window (having menus and/or toolbars of global utility such as "cut" and "paste") may be added to simplify operation of the maintenance tool. Even further, a results window may be desirable in order to display the operation being performed by the user and the status (e.g. success, failure, time-out, error messages) of those operations. Options may be provided to save these messages to a log file and/or to clear the messages in the results window.

Figure 4:
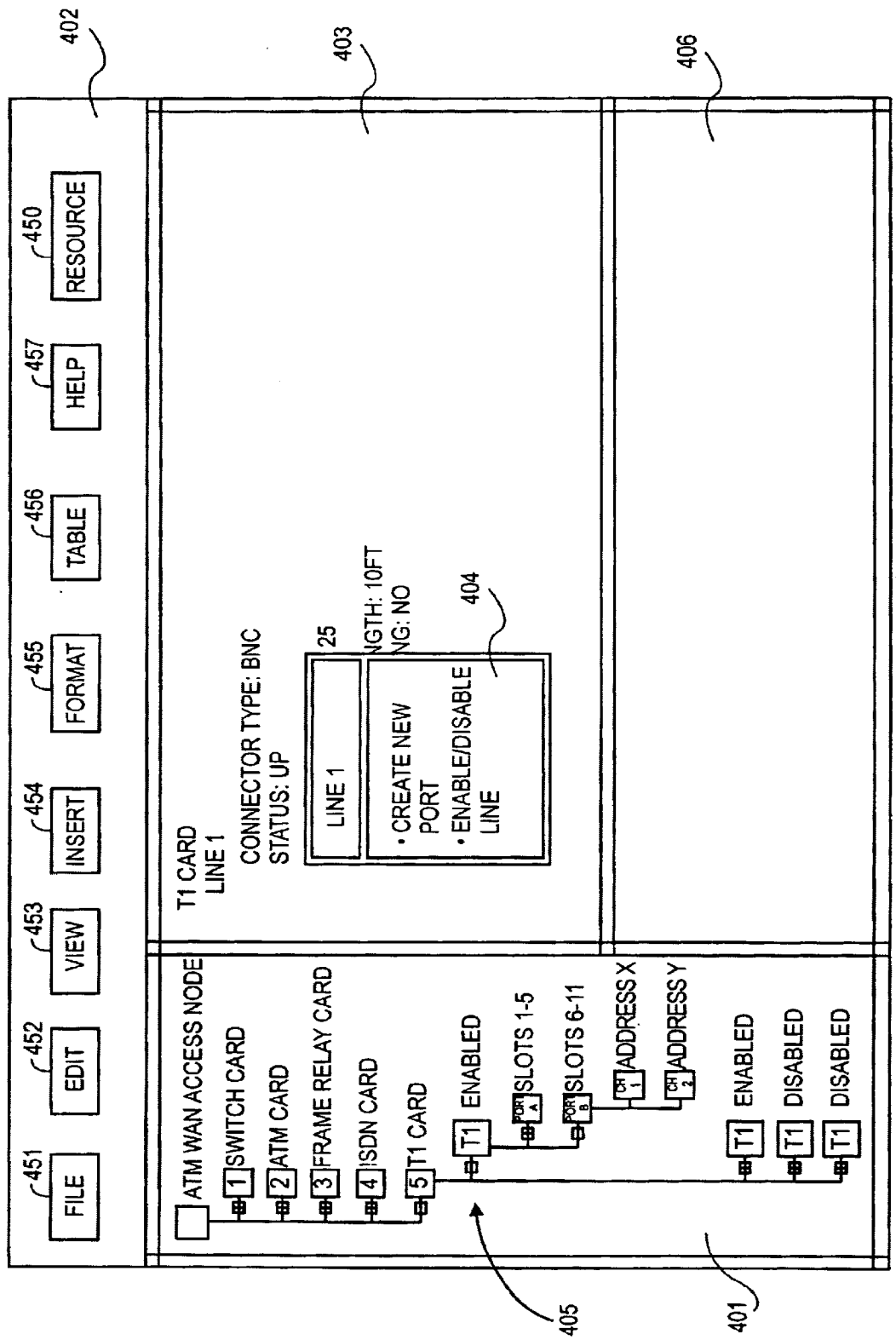
FIG. 4 shows a graphical user interface ("GUI").

FIG. 4 shows one embodiment of the maintenance tool graphical user interface (GUI) 400 having all four of the aforementioned window embodiments. The resource tree window 401 is vertical and therefore resembles the structure depicted in FIG. 3 (as opposed to FIG. 2). The global banner window 402 spans the top of the GUI 400. The configuration window 403 is next to the resource tree window 401. The results window 406 is beneath the configuration window 403. FIG. 4 also shows a CSM 404 for line resource 405. In various embodiments the CSM 404 may be dragged and dropped in any location within the GUI 400 (as shown in FIGS. 4, 5c, 6, 7 and 8). Still other embodiments may attach the CSM to its associated resource such that dragging and dropping is not allowed.

Next, referring to FIG. 5, use of the maintenance tool GUI is explained by way of example. Specifically, an example of a network manager setting up a line on a T1 adapter card plugged into a connector corresponding to card resource 506a is discussed. Initially, as shown in FIG. 5a, the resource tree 501a displays an architectural perspective showing only the card level. That is, no line, port or channel resources are displayed. In order to set up a line in the connector corresponding to card resource 506a, the network manager must first expand the card resource 506a to display the line resources 507-10 (i.e., each physical T1 connection on the adapter card). FIG. 5b shows the GUI interface after card resource 506 is expanded.

All, some or none of the four T1 lines may be active at any given time. In this example, only two lines on the card are activated (corresponding to line resources 507a, 508a) and the network manager wishes to enable a third line (corresponding to line resource 509a). By clicking the mouse button on the third line resource icon 520 (labeled "disabled" in FIG. 5b), the line resource CSM 505 "pops up" as shown in FIG. 5c.

As discussed, the line resource CSM 505 is a menu window wherein menu entries are used to initiate software applicable to the lines on an adapter card. For example, in the embodiment shown in FIG. 5c, the line resource CSM 505 has two menu selections: "create new port" 511 and "enable/disable line" 512. The "create new port" 511 menu selection initiates software necessary for creating a logical port on the selected line. In this example, however, the network manager selects the "enable/disable line" 512 option. In further embodiments the menu selections offered to the user may be a function of the state of the resource. For example, if the line resource is disabled only the "enable line" option is available. Also, if the line is enabled only the "add port" and the "disable line" options are available.

The "enable/disable line" 512 option initiates application software for bringing up or shutting down an adapter card line. Typically, adapter cards have microprocessors that run application software unique to the adapter card (such as line bring-up). After enabling the line by clicking on the "enable/disable line" 512 menu option, configuration window 502c allows for entry of T1 line parameters for line 509b.

Figure 5A:
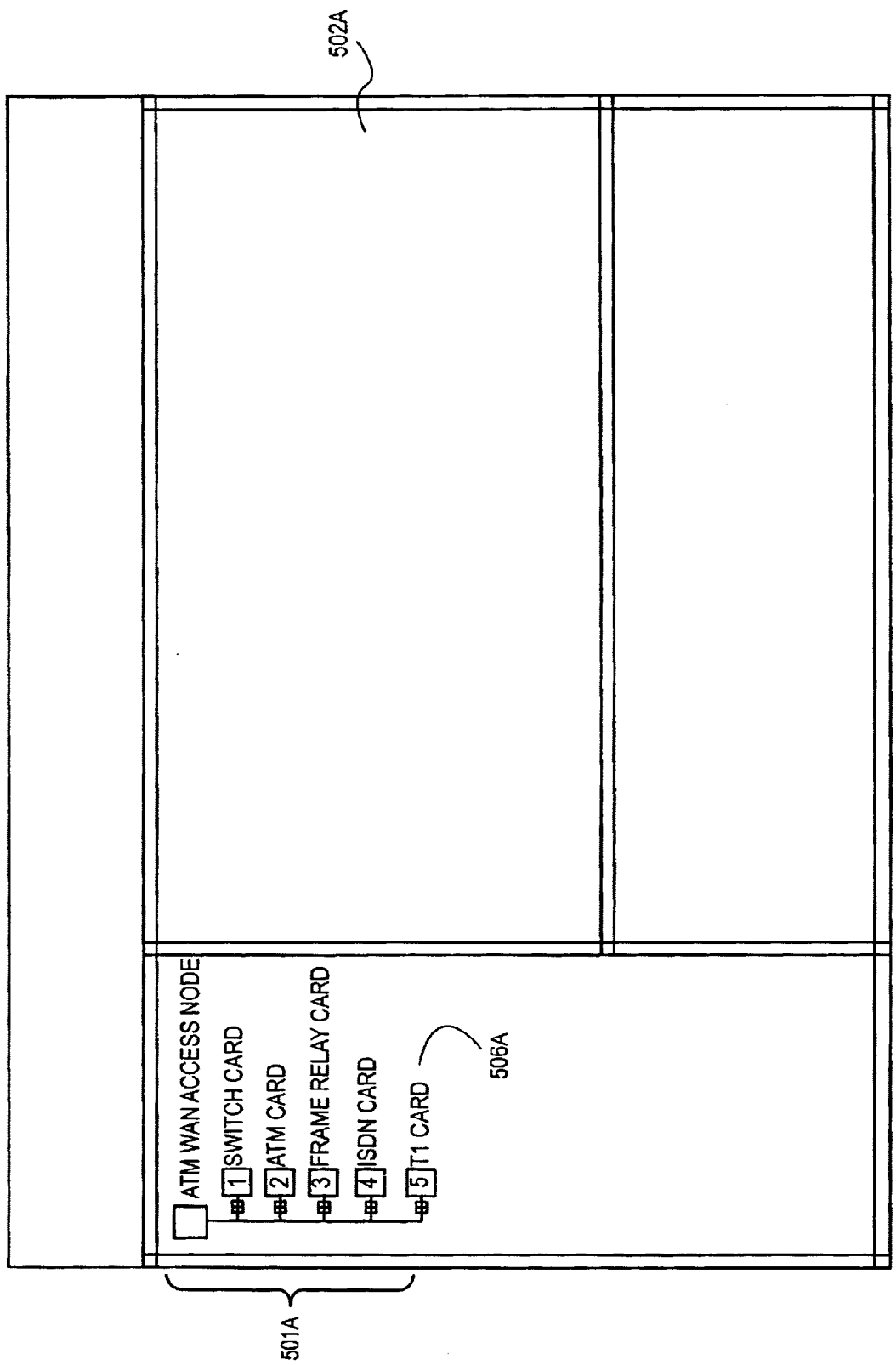
FIG. 5a shows a GUI with a resource tree at the card level.
Figure 5B:
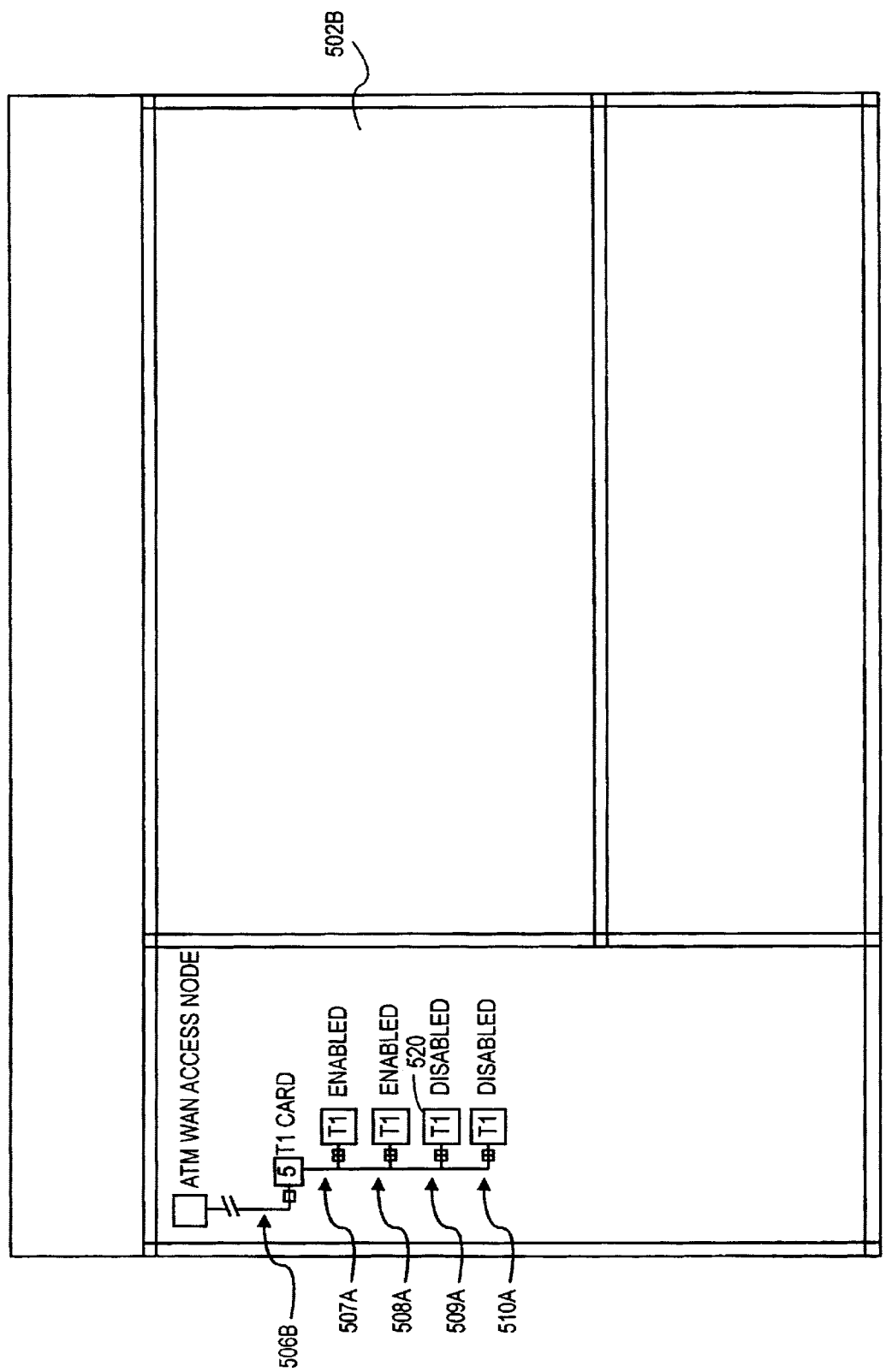
FIG. 5b shows the GUI of FIG. 5a when a card resource is expanded.
Figure 5C:
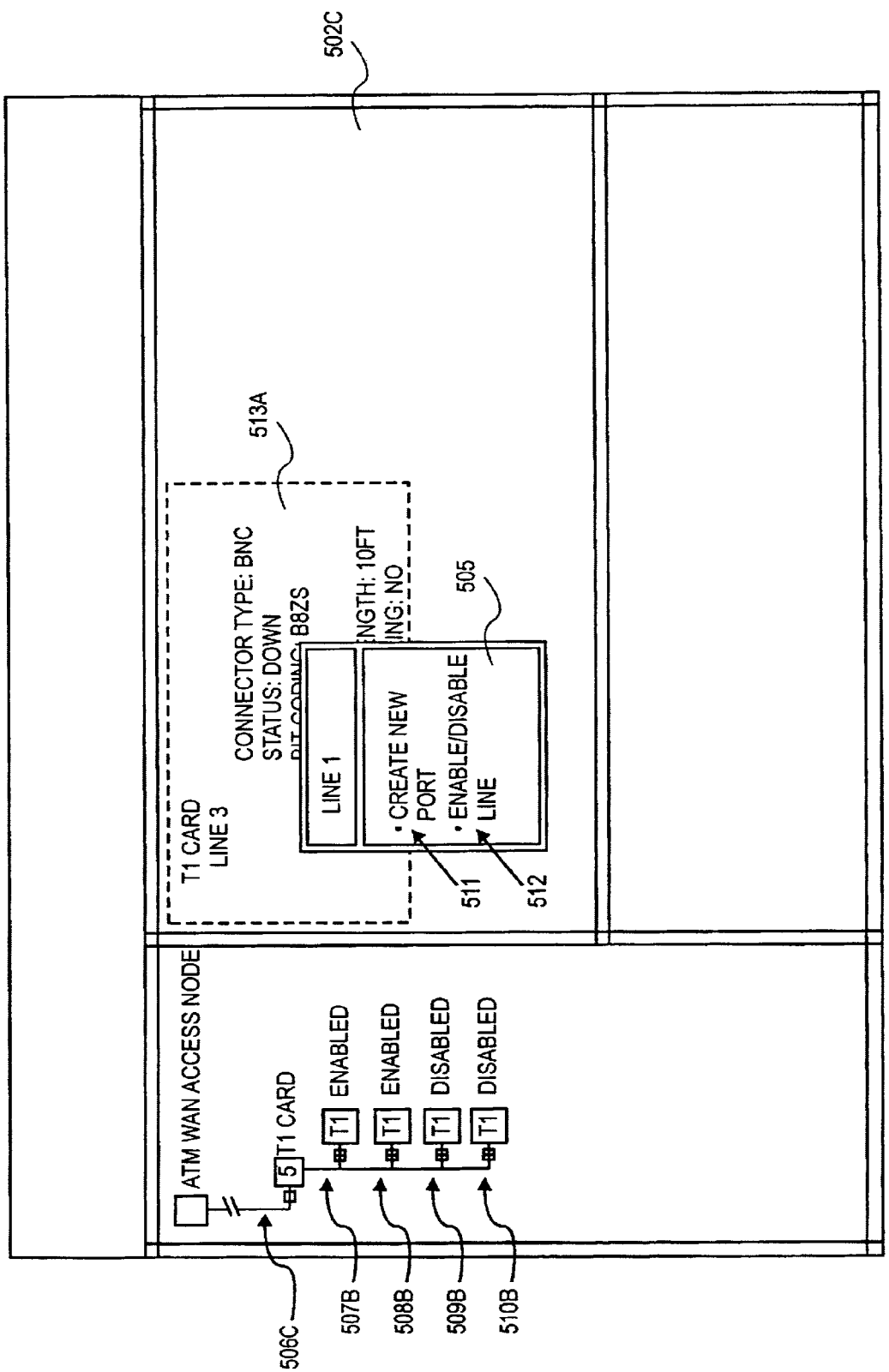
FIG. 5c shows the GUI of FIG. 5b when a line resource is selected.
Figure 5D:
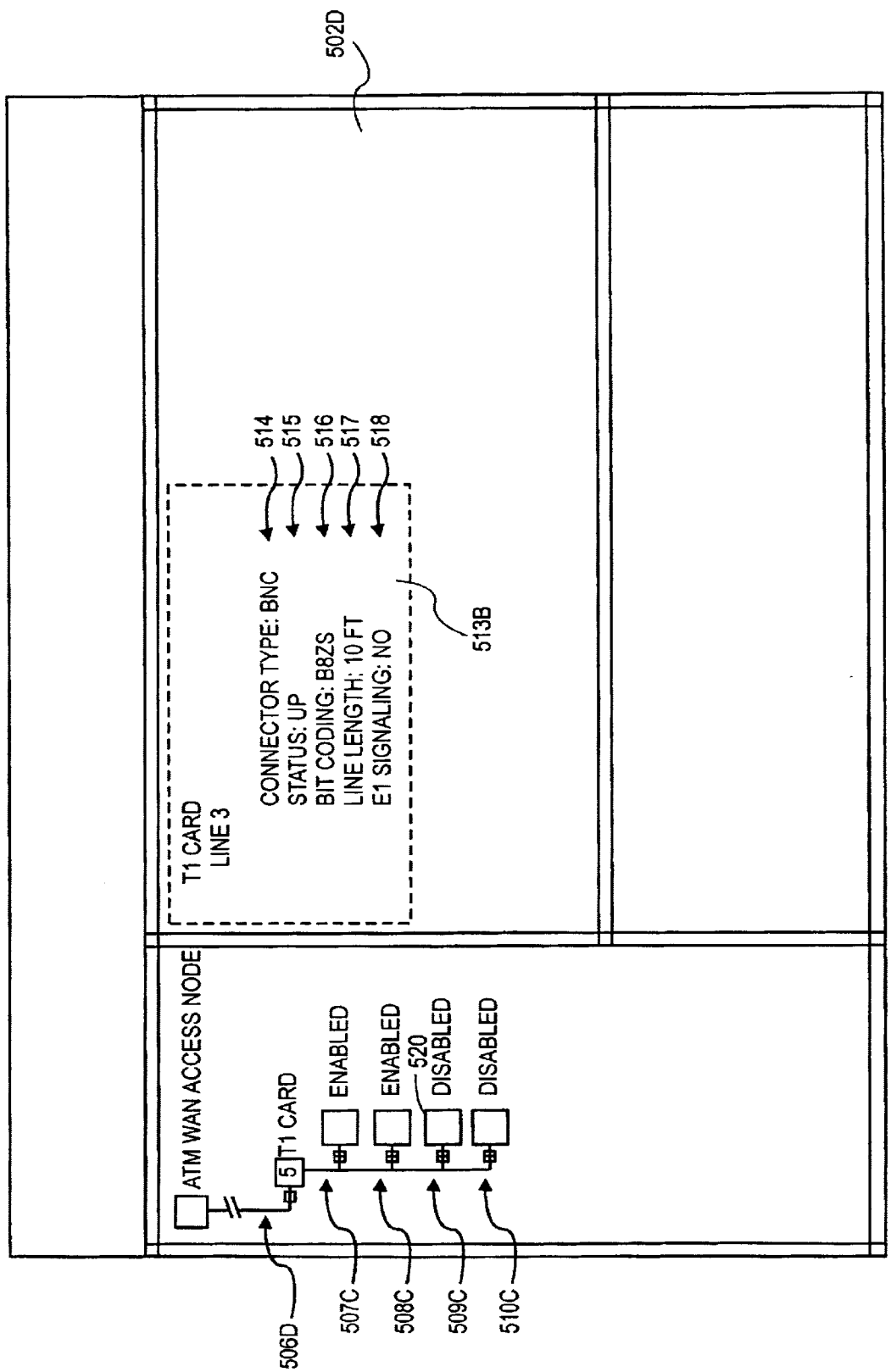
FIG. 5d shows the GUI of FIG. 5c when the line is enabled.

As shown in FIGS. 5c and 5d, once a specific line is selected, a corresponding parameter field 513a,b appears in configuration window 502c,d. A parameter field is a display or user interface of a resource's important parameters. An important parameter is any characteristic a network manager should be aware of or have the capability to modify in order to manage the box reasonably effectively. For example, in FIG. 5d the selected resource is T1 line 509c. The corresponding parameter field 513b has important characteristics of a T1 line: the connector 514 (e.g., BNC or D-Shell), the status of the line 515 (typically "up" or "down"), the bit coding 516 (e.g., B8ZS, AMI or HDB3 for T1 cards having E1 capability), the line length 517 (for adjusting line drivers), and E1 signaling 518 (if the T1 card supports E1). T1 cards having E1 capability are typically cards that require only minor front end changes (such as the connector) and/or logical changes (such as a register based control bit which toggles a framer ASIC to manage 32 as opposed to 24 time slots) in order to convert from T1 to E1 capability.

As shown in FIGS. 5c and 5d, the parameter field 513 may be in the form of a list or have a spread sheet like appearance. In still other embodiments each parameter may have a different GUI widget (like radio buttons, text fields, checkboxes, lists, pop up menus, pull down menus, etc.) appropriate for the data being displayed or obtained.

It is important to note that the parameter fields 513a,b of FIGS. 5c, 5d are illustrative. That is, these parameter fields do not display all the important parameters for a T1 line. As important parameters (or more generally, "parameters") are simply any characteristic that a networking manager should be aware of or have the capability to modify in order to manage the box reasonably effectively, a thorough discussion of each of the parameters associated with every networking resource is not necessary. This is so, especially when considering that the tool described herein is readily applicable to other networking technologies beyond T1 and Frame Relay (e.g., OC-12 and ATM). However, in order to give the reader a feeling for the extent and detail of parameter fields for various networking resources, a full parameter field is presented at the end of this discussion (in FIGS. 9 through 13) for each resource (e.g., node, card, line, port and channel) relating to the T1, Frame Relay example that is discussed herein.

Also in an alternative embodiment, rather than every parameter being listed in a single parameter field, multiple pages of parameter fields may be employed for a single resource. That is, the various parameters are organized into groups (e.g., general, specific, alarms, BERT) where each group is contained on a separate page. Typically, only one page's parameters are visible within the configuration window as the other pages are visually stacked beneath the visible page. However, the other pages are accessible (i.e., may be made visible by being brought to the top of the stack) by simply clicking on visible page tabs containing the name of the group associated with each page. Thus, even though only one page's parameters are visible, the page tab of each page is always visible. In yet another but related embodiment, the page tabs are replaced by a pop-up menu containing the group names associated with each page. A particular page is made visible by selecting its name in this pop up menu. In still yet another embodiment, the group names are actually listed on the resource tree itself beneath the resource having the specific parameters (and corresponding groups). They may visually appear indented and/or traced similar to lower level resources.

It is also possible for the user to click on multiple resources. Usually there is one parameter field per resource, thus clicking on multiple resources pops up multiple parameter fields. In such a case the CSM may only display options common to all the selected resources. Furthermore, the configuration window may have a split screen mode or stack multiple pages as described above.

Continuing with a discussion of the example, during setup of the T1 line, the network manager is allowed to enter or select various parameters 514–518 in the parameter field 513b for the T1 line. When finished setting the parameters, as shown in FIG. 5d, the card software automatically sets up the T1 line and the status parameter 515 toggles from "down" to "up". At this point the T1 line is enabled. Some embodiments may further include a "reset" and/or "apply" menu choice(s) (not shown). The reset menu choice clears any parameter changes before they are implemented and may even further restore the original parameter values. The "apply" menu choice will cause implementation of any newly added or modified parameter values. These menu choices may appear, for example, in the associated CSM, at the bottom of the configuration window and/or the global banner window.

Thus, the configuration window 502d is typically used to display and/or set/modify the various parameter fields associated with each resource (e.g., line resource parameter field 513b). The configuration window 502d may be used to adjust or modify resource related parameters as well as simply check the existing status of the resource without any adjustment or modification. In one embodiment, however, modifications or adjustments to parameters cannot be made unless the resource is actually enabled. For example, line parameters cannot be modified unless the line is actually enabled.

In typical embodiments the CSM pops up if the right mouse button is clicked while the mouse cursor is on the resource. In the same embodiment the parameter field pops up if the left mouse button is clicked while the mouse cursor is on the resource. However, these features are configurable to the tastes of the tool developer and/or the user.

Figure 6:
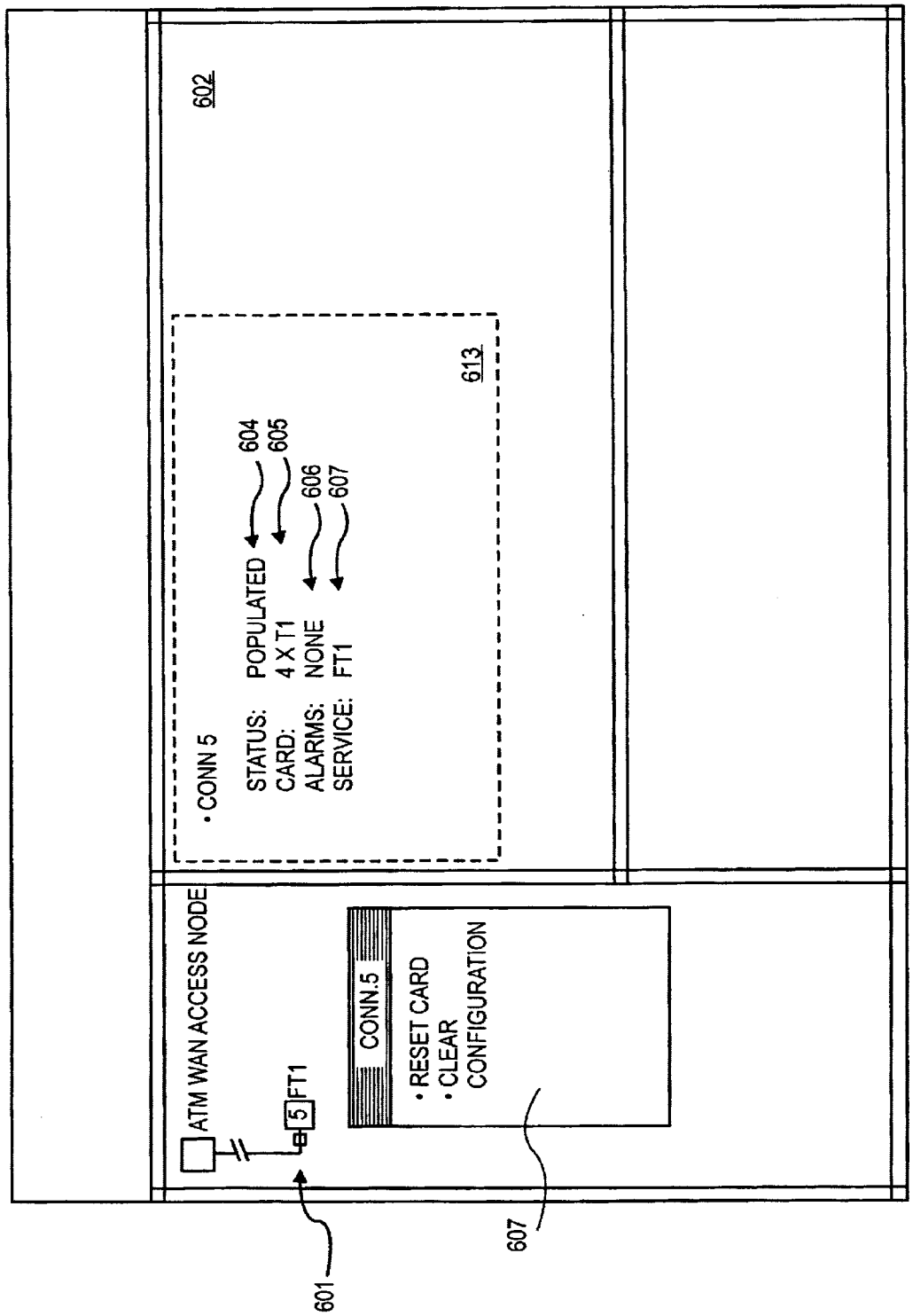
FIG. 6 shows a GUI when a card resource is selected.

The aforementioned example discussed tool operation and use at the line level of architecture. The card, port and channel levels also have their own associated CSMs, configuration windows, etc. For example, FIG. 6 shows a GUI 600 when the card resource 601 is selected. As shown in FIG. 6, the card resource 601 may have a CSM 607 containing the following menu selections: "reset card" and "clear configuration". "Reset card" typically initiates a hard reset such as power down while "clear configuration" typically initiates a soft reset such as clearing all memory and/or registers.

The card resource parameter field 613 may contain within the configuration window 602 a "status" parameter 604 (which indicates whether the connector is populated or not), a "card type" parameter 605 (which identifies the type of card plugged into the connector, e.g., a 4×T1 card or an ATM trunk card); an alarm parameter 606 (which notifies the network manager of card failures) and a service parameter 607 (which identifies the service running over the card plugged into the connector). The service parameter 607 may modify card operation if the hardware supports such a configuration. That is, some adapter cards may be capable of running only one type of service (e.g., a "Frame Relay Only" 4×T1 adapter card) or multiple types of service (e.g., a "Frame Relay/ISDN" 4×T1 adapter card). If the adapter card does not provide multiservice capability then the service may be identified at the slot level. However, if the card is capable of multiple services then each service may be identified at the line level. If a multiservice card is employed, the service parameter 607 may be used to enable a supported service whereas the service parameter is a mere default status identifier for single service cards. Again, a more detailed parameter field for a card resource is presented at the end of this discussion.

In one embodiment (not shown in FIG. 6), the alarm parameter 606 identifies current alarms according to the degree of seriousness such as "Major" and "Minor". "Major" alarms typically correspond to "hard" failures such as a dead laser in a fiber optic adapter card. "Minor" alarms typically correspond to soft errors such as CRC failures.

Alarms may also be upward looking. That is, if an alarm triggering condition occurs not only may the tool update the parameter field of the associated resource but also the resource icon and text within the resource tree. Furthermore, the GUI may present all higher level resources in the resource tree in an agitated appearance such as changing colors (e.g. to red) or toggling two different colors repeatedly. Thus, for example, if a lower level channel has an alarm condition, the higher level port, line, card and node resources will all be given an agitated appearance so that the user will see the in alarm no matter what level of detail the architectural perspective currently is. The user may therefore easily drill down the resource tree and trace the agitated resources to the resource suffering the alarm condition. Agitated appearances may also include different icons for alarmed and non-alarmed states.

Figure 7:
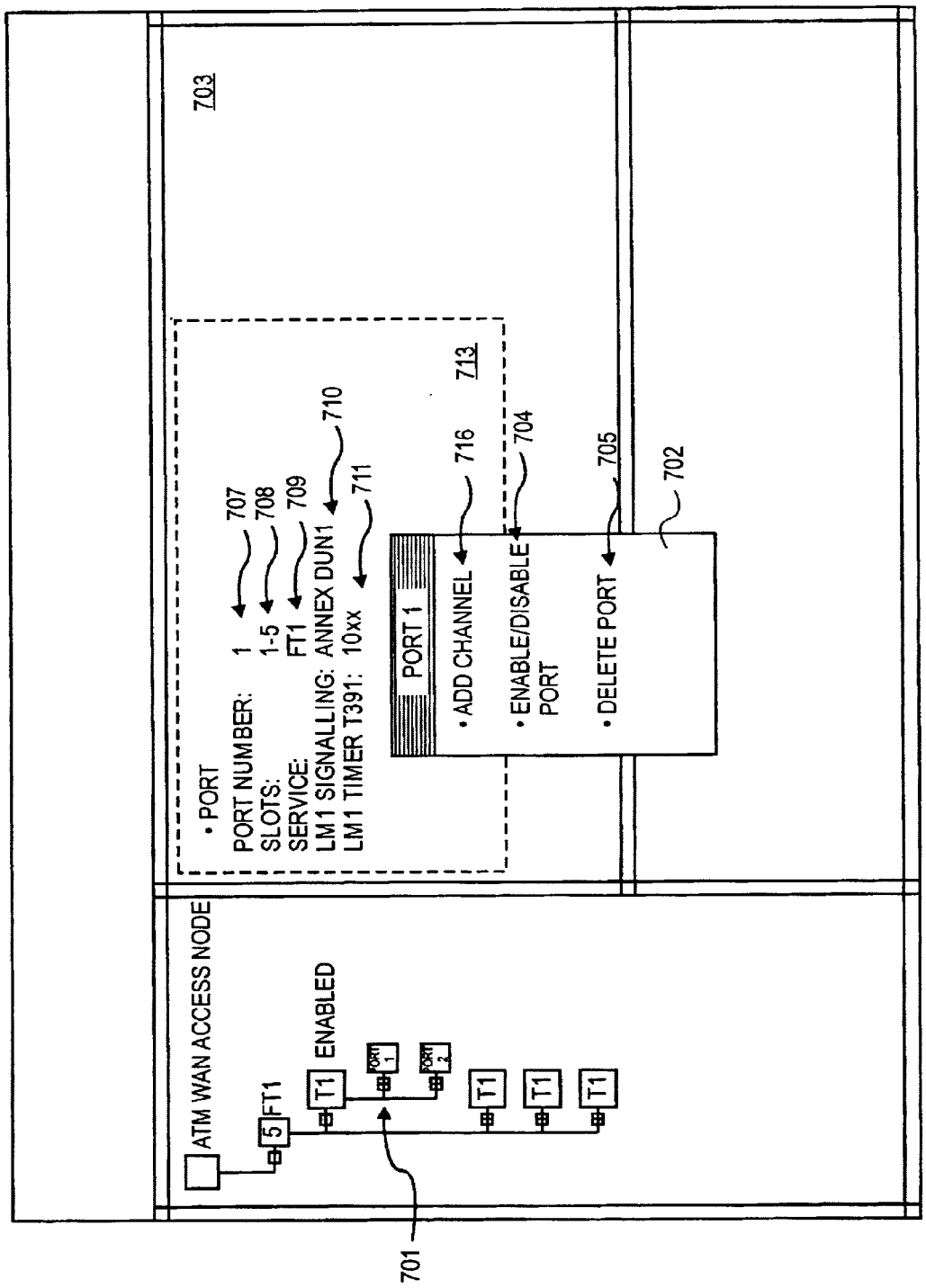
FIG. 7 shows a GUI when a port resource is selected.

FIG. 7 shows the GUI 700 when the port resource 701 is selected. The port resource CSM 702 is also shown. The port resource CSM702 may have three menu selections: "add channel" 716 (which sets up a channel within the selected port); "enable/disable port" 704 (which makes a port active or inactive); and "delete port" 705 (which removes the port as a logical entity). When the port resource is selected, the configuration window's 703 port parameter field 713 may identify the port within the line (e.g., via "port number" parameter 707); the specific slots within the T1 frame that form each port (e.g., via "slots" parameter 708); the type of service running on the port, such as Frame Relay, FUNI, or F-Forward (e.g., via "service" parameter 709); and any LMI configuration information (e.g., via parameters 710, 711).

Figure 8:
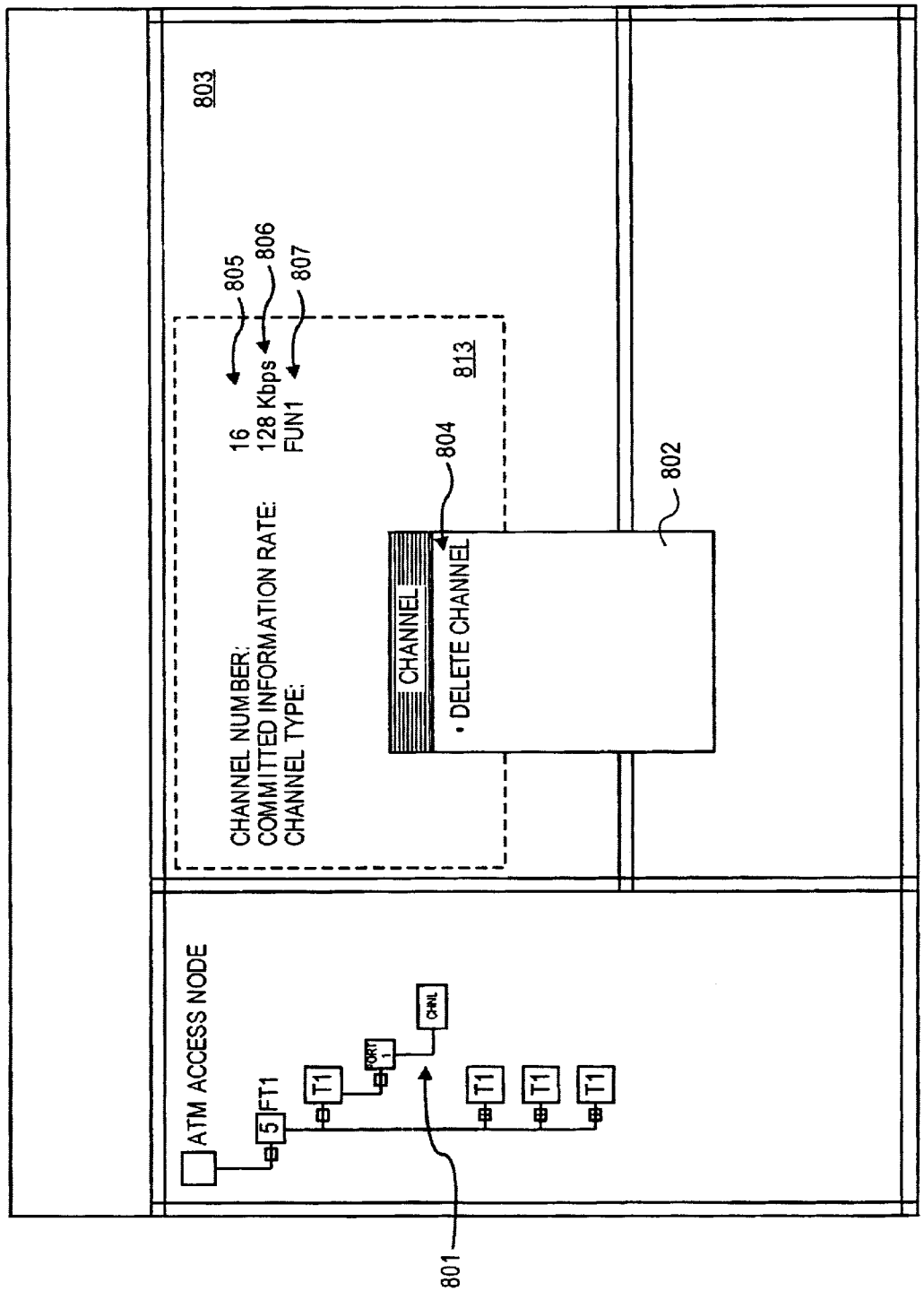
FIG. 8 shows a GUI when a channel resource is selected.

FIG. 8 shows the GUI 800 when the channel resource 801 is selected. The channel CSM 802 is also shown. In this embodiment, the channel CSM 802 only has "delete channel" menu selection 804. This is consistent with the aforementioned embodiments where specific resources are deleted at their corresponding CSM but added at the next highest CSM. That is, the "add-channel" 703 menu selection appears in the port CSM 702 (referring briefly back to FIG. 7). The channel parameter field 813 may have three parameters: "circuit ID" 805 (which contains source/destination information such as DLCI for T1); "committed information rate" 806 which limits the traffic rate and "channel type" 807 which identifies the type of traffic and data transformations to be performed if any.

So far the embodiments discussed herein have been related to T1 technology. In many instances adapter card technology can provide different services (Frame Relay, PSTN, ISDN or even ATM) over a T1 connection. However, other line technologies (such as T3, HSSI, OC-3,12, etc.) may be controlled within the maintenance tool environment as well to provide a wider variety of services.

The maintenance tool discussed herein may be viewed as a high layer of software that "runs over", in many cases, pre-existing software. To the extent that improved silicon integration has not resulted in additional adapter card functionality, much of the unique software routines that configure each card have been "frozen" for some time. Thus the maintenance tool relates more to presenting adapter card routines than developing additional adapter card software. That is, for the most part the maintenance tool is a graphical user interface having a translation layer beneath it. In many cases, the translation layer simply translates user commands (such as pointing and clicking in the CSM) to corresponding inputs for pre-existing card related software. Thus, the maintenance tool may be viewed as a standardized interface for presenting card related software. The software environment necessary to develop the maintenance tool interface may be any API or graphical object widget package.

Such maintenance software usually runs on a computer separate from the device being maintained. The maintenance software communicates with the device using SNMP (Simple Network Management Protocol) or any other standard/proprietary protocol. Furthermore, if a separate computer is used to manage the device a higher level architectural perspective may be utilized which lists all devices as separate resources. The network manager may then click on the device resource to configure parameters associated with that device.

It is important to note that various details have been omitted from FIGS. 5–8, such as the user menus within the global banner window (e.g. menus 451–457 in FIG. 4). These omissions were made in order to present the matter being discussed in relation to FIGS. 5–8 in a less cluttered manner. These omissions should not be construed to limit FIGS. 5–8 to only the specific depictions made therein.

Referring back to FIG. 4, the global banner window 402 is another major window of the maintenance tool 400. The global banner window provides a set of menus, for example menus 450–457, that provide access to functionality having global utility. For example the "File" menu 451 provides options for storing and recalling filed architectural perspectives. The "Edit" menu 452 provides cutting, copying and pasting of an entire resource. For example, if a network manager wishes to set up a T1 line identically to another pre-existing T1 line, the manager only needs to copy the resource icon for the pre-existing icon and paste it on the T1 line that is to be setup. Logical resources like ports can be copied and pasted on their higher level resource (a line in this case). This would result in the port being added to the line or modifying an existing port if the port identifier of the port being pasted already existed. A resource can be moved by "cutting" and then pasting. The copy and move operations can also be performed by dragging and dropping resources. The operation (copy or move) can either be implicit based on the resources being dragged and/or the location where it is dropped or it can be explicit by the use of modifiers (for example, the <alt> key specifies a. copy operation while the <control> key specifies a move operation). Other menus typical of PC operating system software such as View 453, Insert 454, Format 455, Table 456, Help 457, Tools (not shown) may also be included in the global banner window.

Also, a menu unique to the maintenance tool 400, the resource menu 450 may be added. The resource menu 450 is essentially a duplicate of the CSM. That is, when the resource menu is selected a sub-menu drops down with options identical to those found within the CSM. A resource must be selected so the resource menu knows which CSM functions to display. Furthermore, the view menu may drop down to display sub menu options including: alarms, redundancy, configuration, counters, debug and the ability to choose a combination of these views.

If the alarms view is selected only resources currently showing an alarm condition is shown in the resource tree window. As discussed, higher level resources of the lowest level resource suffering an alarm condition will be shown in an agitated state so the user can easily drill down and find the lowest level resource.

If the redundancy view is selected, essentially the resource tree window displays a view of the redundancy auxiliary resource (discussed ahead). The configuration view is the standard view (e.g. as shown in FIG. 4). That is, the configuration view displays the basic architectural perspective within the resource tree window. The counter view displays in-situ data such as passed and dropped packets. In the counter view, only those resources having counters or that otherwise track various statistics are displayed in the resource tree. The counters, etc. appear within the parameter field any time a resource is selected. The debug view allows an operator to look at proprietary or other data typically hidden from an ordinary user (e.g., a diagnostic result register). Thus, in debug view additional matter appears that is not usually displayed to ordinary users. In one embodiment, the debug view requires a password in order to gain access to the typically hidden information. The user can select any combination of these views wherein the information of the selected views are presented together in a split screen mode or otherwise.

Returning back to a discussion of the resource tree, the resource tree may have additional, non-adapter card related "resources", referred to as auxiliary resources. The auxiliary resources may be placed at the bottom of the resource tree so that the box's architectural perspective is not confused. Some of the auxiliary resources may provide access to additional important box-related information and maintenance software. For example, a "redundancy" resource that displays each card supported by redundancy as a lower level, "primary card" resource. Each primary card resource may have even lower level "secondary card" resource(s) that represent the back up card(s) for the primary card. The redundancy resource may also display the reverse of the above. That is, secondary cards appear as a higher level resource. The list of lower level primary card resources show how many different cards a single back-up (i.e. secondary) card supports. In yet another redundancy resource view the two highest level resources are primary and secondary. The primary resource lists all primary cards as lower level resources which in turn list their secondary card as a lower level resource; the secondary resource lists all secondary resources as lower level resources which in turn list their primary card(s) as lower level resource(s).

Redundancy can be configured by dragging and dropping a card resource into the primary (or secondary) high level resource. The secondary (or primary) for the newly created primary (or secondary) card resource is configured by dragging the desired card resource and dropping it on the primary (or secondary) card resource.

Further auxiliary resources may include a device alarms resource which organizes the display of any active alarms. The alarm resource displays all the alarm entries within the configuration window. A table GUI widget may be used to display a list of active alarms so that various items associated with the alarm may be visually separated. For example, the alarm's severity may be shown in the first column with an icon and/or text label which may also be color coded. The second column may display the timestamp of the alarm entry which indicates when the alarm occurred in the device. The third column may display a description of the alarm event. The entries can be filtered and/or sorted on any column or combination of columns.

Other auxiliary resources include a device log resource that organizes the events logbook of the box (and may display it similar to the alarm entries) and a trap managers resource that lists the IP address and port number for the various SNMP trap managers in communication with the box.

It is important to note that, as discussed, a parameter is any characteristic a network manager should be aware of or have the capability to modify in order to manage the box reasonably effectively. The parameter fields as shown in FIGS. 4, 5c, 5d, 6, 7, and 8 are examples for purposes of simple illustration. More detailed or comprehensive parameter fields are possible. FIGS. 9–13 are a more comprehensive (but not exclusive) list of the various parameters associated with node, card, line, port, and channel resources for Frame Relay over a DS1/(T1/E1) line respectively. The various parameters are also shown grouped under headings (e.g., "general" and "line module" for the card level resource) which may be used in any of the aforementioned paged embodiments.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

What is claimed is:

1. An apparatus that can display a graphical user interface, said graphical user interface capable of comprising:
   a) a resource tree window that presents a perspective of a networking hardware box architecture, said resource tree having:
      i) a card resource for a line card that is inserted into said networking hardware box, said card resource being expanded so as to display:
      ii) a line resource for a networking line on said line card that is represented by said expanded card resource;
   b) a maintenance menu that appeared in response to said line resource being clicked on with a first button of a mouse, said maintenance menu further comprising a menu selection option that triggers the execution of a task that is performed upon said networking line that is represented by said line resource that was clicked on; and
   c) a configuration window that does not overlap said resource tree, said configuration window further comprising a parameter field for said networking line that is represented by said line resource that was clicked on, said parameter field having appeared in response to clicking on said line resource with a second button of said mouse, said maintenance menu capable of being dragged over said parameter field.

2. The apparatus of claim 1 wherein said maintenance menu is a context sensitive menu.

3. The apparatus of claim 1 wherein said maintenance menu selection option further comprises a line enable option.

4. The apparatus of claim 3 wherein said task enables said networking line that is represented by said line resource that was clicked on.

5. The apparatus of claim 3 wherein said task disables said networking line that is represented by said line resource that was clicked on.

6. The apparatus of claim 1 wherein said maintenance menu selection option further comprises a line disable option.

7. The apparatus of claim 1 wherein said maintenance menu selection option further comprises a create new port option.

8. The apparatus of claim 7 wherein said task helps create a new port on said networking line that is represented by said line resource that was clicked on.

9. The apparatus of claim 1 wherein said parameter field further comprises the status of said networking line that is represented by said line resource that was clicked on.

10. The apparatus of claim 1 wherein said parameter field further comprises the encoding on said networking line that is represented by said line resource that was clicked on.

11. The apparatus of claim 1 wherein said parameter field further comprises a clocking source of said networking line that is represented by said line resource that was clicked on.

12. The apparatus of claim 1 wherein said graphical user interface further comprises a third window, said third window being a global banner window having a file menu.

13. An apparatus that can display a graphical user interface, said graphical user interface capable of comprising:
   a) a resource tree window that presents a perspective of a networking hardware box architecture, said resource tree having:
      i) a card resource for a line card that is inserted into said networking hardware box, said card resource being expanded so as to display:
      ii) a line resource for a networking line on said line card that is represented by said expanded card resource, said line resource being expanded so as to display:
      iii) a port resource for a port on said networking line that is represented by said expanded line resource;
   b) a maintenance menu that appeared in response to said port resource being clicked on with a first button of said mouse, said maintenance menu further comprising a menu selection option that triggers the execution of a task that is performed upon said port that is represented by said port resource that was clicked on; and c) a configuration window that does not overlap said resource tree, said configuration window further comprising a parameter field for said port that is represented by said port resource that was clicked on, said parameter field having appeared in response to clicking on said port resource with a second button of said mouse, said maintenance menu capable of being dragged over said parameter field.

14. The apparatus of claim 13 wherein said maintenance menu is a context sensitive menu.

15. The apparatus of claim 13 wherein said maintenance menu selection option further comprises a delete port option.

16. The apparatus of claim 15 wherein said task deletes said port that is represented by said port resource that was clicked on.

17. The apparatus of claim 13 wherein said maintenance menu selection option further comprises an add channel option.

18. The apparatus of claim 17 wherein said task helps to add a channel to said port that is represented by said port resource that was clicked on.

19. The apparatus of claim 13 wherein said maintenance menu selection option further comprises an enable port option.

20. The apparatus of claim 19 wherein said task enables said port that is represented by said port resource that was clicked on.

21. The apparatus of claim 13 wherein said maintenance menu selection option further comprises a disable port option.

22. The apparatus of claim 21 wherein said task disables said port that is represented by said port resource that was clicked on.

23. The apparatus of claim 13 wherein said parameter field further comprises an identification number for said port that is represented by said port resource that was clicked on.

24. The apparatus of claim 13 wherein said parameter field identifies which slots on said networking line that is represented by said expanded line resource are used to form said port that is represented by said port resource that was clicked on.

25. The apparatus of claim 13 wherein said parameter field identifies the type of service being provided on said port that is represented by said port resource that was clicked on.

26. The apparatus of claim 25 wherein said service is ISDN.

27. The apparatus of claim 25 wherein said service is Frame Relay.

28. The apparatus of claim 25 wherein said service is PSTN.

29. An apparatus that can display a graphical user interface, said graphical user interface capable of comprising:
   a) a resource tree window that presents a perspective of a networking hardware box architecture, said resource tree having:
      i) a card resource for a card that is inserted into said networking hardware box, said card resource being expanded so as to display:
         ii) a line resource for a networking line on said line card that is represented by said expanded card resource, said line resource being expanded so as to display:
            iii) a port resource for a port on said networking line that is represented by said expanded line resource, said port resource being expanded so as to display:
               iv) a channel resource for a channel on said port that is represented by said expanded port;
   b) a maintenance menu that appeared in response to said channel resource being clicked on with a first button of a mouse, said maintenance menu further comprising a menu selection option that triggers the execution of a task that is performed upon said channel that is represented by said channel resource that was clicked on; and
   c) a configuration window that does not overlap said resource tree, said configuration window further comprising a parameter field for said channel that is represented by said channel resource that was clicked on, said parameter field having appeared in response to clicking on said channel resource with a second button of said mouse, said maintenance menu capable of being dragged over said parameter field.

30. The apparatus of claim 29 wherein said maintenance menu is a context sensitive menu.

31. The apparatus of claim 29 wherein said maintenance menu selection option further comprises a delete channel option.

32. The apparatus of claim 31 wherein said task disables said channel that is represented by said channel resource that was clicked on.

33. The apparatus of claim 29 herein said parameter field identifies source/destination information for said channel that is represented by said channel resource that was clicked on.

34. The apparatus of claim 33 wherein said source/destination information is DLCI information.

35. A method, comprising:
   a displaying within a graphical user interface (GUI) a resource tree window that presents a perspective of a networking hardware box architecture, said resource tree having:
      i) a card resource for a line card that is inserted into said networking hardware box, said card resource being expanded so as to display:
         ii) a line resource for a networking line on said line card that is represented by said expanded card resource;
   b) displaying within said GUI a maintenance menu that appeared in response to said line resource being clicked on with a first button of said mouse, said maintenance menu further comprising a menu selection option that triggers the execution of a task that is performed upon said networking line that is represented by said line resource that was clicked on;
   c) displaying within said GUI a configuration window that does not overlap said resource tree, said configuration window further comprising a parameter field for said networking line that is represented by said line resource that was clicked on, said parameter field having appeared in response to clicking on said line resource with a second button of said mouse; and
   d) dragging said maintenance menu over said parameter field.

36. The method of claim 35 wherein said maintenance menu is a context sensitive menu.

37. The method of claim 35 further comprising dropping said maintenance menu on said GUI after said dragging.

38. The method of claim 35 wherein said maintenance menu selection option further comprises a line enable option.

39. The method of claim 38 further comprising executing said task by enabling said networking line that is represented by said line resource that was clicked on, said enabling in response to clicking on said line enable option.

40. The method of claim 35 wherein said maintenance menu selection option further comprises a line disable option.

41. The method of claim 40 further comprising executing said task by disabling said networking line that is represented by said line resource that was clicked on, said disabling in response to clicking on said line disable option.

42. The method of claim 35 wherein said maintenance menu selection option further comprises a create new port option.

43. The method of claim 42 further comprising executing said task by creating a new port on said networking line that is represented by said line resource that was clicked on, said creating in response to clicking on said create new port option.

44. A machine readable medium having stored thereon instructions which when executed by a digital processing system cause said digital processing system to perform a method, said method comprising:
   a) displaying within a graphical user interface (GUI) a resource tree window that presents a perspective of a networking hardware box architecture, said resource tree having:
      i) a card resource for a line card that is inserted into said networking hardware box, said card resource being expanded so as to display:
         ii) a line resource for a networking line on said line card that is represented by said expanded card resource;
   b) displaying within said GUI a maintenance menu that appeared in response to said line resource being clicked on with a first button of said mouse, said maintenance menu further comprising a menu selection option that triggers the execution of a task that is performed upon said networking line that is represented by said line resource that was clicked on; and
   c) displaying within said GUI a configuration window that does not overlap said resource tree, said configuration window further comprising a parameter field for said networking line that is represented by said line resource that was clicked on, said parameter field having appeared in response to clicking on said line resource with a second button of said mouse, said maintenance menu capable of being dragged over said parameter field.

45. The machine readable medium of claim 44 wherein said maintenance menu is a context sensitive menu.

46. The machine readable medium of claim 44 wherein said maintenance menu selection option further comprises a line enable option.

47. The machine readable medium of claim 46 wherein clicking on said line enable option causes the execution of said task so as to enable said networking line that is represented by said line resource that was clicked on.

48. The machine readable medium of claim 44 wherein said maintenance menu selection option further comprises a line disable option.

49. The machine readable medium of claim 48 wherein clicking on said line disable option causes the execution of said task so as to disable said networking line that is represented by said line resource that was clicked on.

50. The machine readable medium of claim 44 wherein said maintenance menu selection option further comprises a create new port option.

51. The machine readable medium of claim 50 wherein clicking on said create new port option causes the execution of said task so as to create a new port on said networking line that is represented by said line resource that was clicked on.

52. The machine readable medium of claim 44 wherein said parameter field further comprises the status of said networking line that is represented by said line resource that was clicked on.

53. The machine readable medium of claim 44 wherein said parameter field further comprises the encoding on said networking line that is represented by said line resource that was clicked on.

54. The machine readable medium of claim 44 wherein said parameter field further comprises a clocking source of said networking line that is represented by said line resource that was clicked on.

55. The machine readable medium of claim 44 wherein said graphical user interface further comprises a third window, said third window being a global banner window having a file menu.

56. An apparatus that can display a graphical user interface, said graphical user interface capable of comprising:
   a) a resource tree window that presents a perspective of a networking hardware box architecture, said resource tree having:
      i) a card resource for a line card inserted into said networking hardware box;
   b) a maintenance menu that appeared in response to said card resource being clicked on with a first button of a mouse, said maintenance menu further comprising a menu selection option that triggers the execution of a task that is performed upon said line card that is represented by said card resource that was clicked on; and
   c) a configuration window that does not overlap said resource tree, said configuration window further comprising a parameter field for said line card that is represented by said card resource that was clicked on, said parameter field having appeared in response to clicking on said card resource with a second button of said mouse, said maintenance menu capable of being dragged over said parameter field.

57. The apparatus of claim 56 wherein said maintenance menu is a context sensitive menu.

58. The apparatus of claim 56 wherein said maintenance menu selection option further comprises a card reset option.

59. The apparatus of claim 58 wherein said task hard resets said line card that is represented by said card resource that was clicked on.

60. The apparatus of claim 56 wherein said maintenance menu selection option further comprises a clear configuration option.

61. The apparatus of claim 60 wherein said task soft resets said line card that is represented by said card resource that was clicked on.

62. The apparatus of claim 56 wherein said parameter field further comprises a status parameter that indicates said line card that is represented by said card resource that was clicked on is said inserted.

63. The apparatus of claim 56 wherein said parameter field further comprises a type parameter that indicates the type of line card that is represented by said card resource that was clicked on.

64. The apparatus of claim 56 wherein said parameter field further comprises an alarm parameter that indicates whether any operational failures are associated with said line card that is represented by said card resource that was clicked on.

65. The apparatus of claim 56 wherein said parameter field further comprises a service parameter that indicates a service running over said line card that is represented by said card resource.

66. The apparatus of claim 56 wherein said graphical user interface further comprises a third window, said third window being a global banner window having a file menu.

67. A machine readable medium having stored thereon instructions which when executed by a digital processing system cause said digital processing system to perform a method, said method comprising:
   a) displaying a resource tree window that presents a perspective of a networking hardware box architecture, said resource tree having:
      i) a card resource for a line card inserted into said networking hardware box;
   b) displaying a maintenance menu in response to said card resource being clicked on with a first button of a mouse, said maintenance menu further comprising a menu selection option that triggers the execution of a task that is performed upon said line card that is represented by said card resource that was clicked on; and
   c) displaying a configuration window that does not overlap said resource tree, said configuration window further comprising a parameter field for said line card that is represented by said card resource that was clicked on, said parameter field having appeared in response to clicking on said card resource with a second button of said mouse, said maintenance menu capable of being dragged over said parameter field.

68. The machine readable menu of claim 67 wherein said maintenance menu is a context sensitive menu.

69. The machine readable of claim 67 wherein said maintenance menu selection option further comprises a card reset option.

70. The machine readable medium of claim 69 wherein said task hard resets said line card that is represented by said card resource that was clicked on.

71. The machine readable medium of claim 67 wherein said maintenance menu selection option further comprises a clear configuration option.

72. The machine readable medium of claim 71 wherein said task soft resets said line card that is represented by said card resource that was clicked on.

73. The machine readable medium of claim 67 wherein said parameter field further comprises a status parameter that indicates said line card that is represented by said card resource that was clicked on is said inserted.

74. The machine readable medium of claim 67 wherein said parameter field further comprises a type parameter that indicates the type of line card that is represented by said card resource that was clicked on.

75. The machine readable medium of claim 67 wherein said parameter field further comprises an alarm parameter that indicates whether any operational failures are associated with said line card that is represented by said card resource that was clicked on.

76. The machine readable medium of claim 67 wherein said parameter field further comprises a service parameter that indicates a service running over said line card that is represented by said card resource.

77. The machine readable medium of claim 67 wherein said graphical user interface further comprises a third window, said third window being a global banner window having a file menu.

* * * * *